United States Patent [19]

Pommier et al.

[11] Patent Number: 5,738,579
[45] Date of Patent: Apr. 14, 1998

[54] HEATING VENTILATING AND/OR AIR CONDITIONING APPARATUS, ESPECIALLY FOR MOTOR VEHICLES

[75] Inventors: Didier Pommier, Maintenon; Gilles Elliot, Courcouronnes, both of France

[73] Assignee: Valeo Climatisation, La Verriere, France

[21] Appl. No.: 771,396

[22] Filed: Dec. 19, 1996

[30] Foreign Application Priority Data

Dec. 22, 1995 [FR] France ................... 95 15427

[51] Int. Cl.$^6$ ................... B60H 1/06
[52] U.S. Cl. ................... 454/160; 454/126
[58] Field of Search ................... 454/121, 126, 454/159, 160, 75

[56] References Cited

U.S. PATENT DOCUMENTS

| | | |
|---|---|---|
| 3,948,312 | 4/1976 | Nisbet. |
| 4,608,914 | 9/1986 | Shimada et al. ................... 454/160 |
| 5,014,911 | 5/1991 | Vicnent ................... 454/160 X |
| 5,016,704 | 5/1991 | Ono ................... 454/160 |
| 5,199,485 | 4/1993 | Ito et al. ................... 454/160 X |

FOREIGN PATENT DOCUMENTS

| | | |
|---|---|---|
| 212306 | 4/1987 | European Pat. Off.. |
| 289405 | 11/1988 | European Pat. Off.. |
| 2 247 680 | 5/1975 | France. |
| 30 10 329 | 9/1981 | Germany. |
| 57-95212 | 6/1982 | Japan ................... 454/160 |

Primary Examiner—Harold Joyce
Attorney, Agent, or Firm—Morgan & Finnegan, L.L.P.

[57] ABSTRACT

A motor vehicle heating and ventilating, and/or air conditioning, installation includes a heating and air distribution unit comprising a casing, the inlet of which is connected to the delivery side of a motorised fan unit. The casing has two outlets, namely a "feet" outlet leading to a lower part of the cabin of the vehicle, and a ventilation outlet, also leading into the cabin. The casing is divided into three ducts. Each of the first and second ducts has an upstream end open at the inlet of the casing, and a downstream end communicating with the feet and ventilation outlets of the casing respectively, under the control of a first flap valve and a second flap valve respectively. The third duct lies between the first and second ducts and has a central portion containing a heat exchanger. The upstream end of the third duct communicates, under the control of a third valve, with the inlet of the casing, and the third duct has two downstream outlets, namely a "feet" outlet and a ventilation outlet, which communicate respectively, under the control of the first and second valves, with the feet and ventilation outlets of the casing. Control means are provided for acting selectively on the various valves so as to put them into selected positions.

11 Claims, 2 Drawing Sheets

5,738,579

HEATING VENTILATING AND/OR AIR CONDITIONING APPARATUS, ESPECIALLY FOR MOTOR VEHICLES

FIELD OF THE INVENTION

This invention relates to apparatus for heating, ventilating and/or air conditioning, especially for motor vehicles, and more particularly to a heating and air distribution unit forming part of such an apparatus.

BACKGROUND OF THE INVENTION

Heating and air distribution units for apparatus of the above kind are known which comprise a casing containing a heat exchanger. The casing is provided, firstly, with an air inlet which is supplied with air by a motorised fan unit which also forms part of the apparatus, and secondly, with air outlets directed towards lower and middle regions of the cabin of the vehicle in which the apparatus is mounted, with access of air to these outlets being controlled by a first valve and a second valve respectively. These valves also form part of the heating and air distribution unit, and in such units as currently used, each of these valves normally has a single purpose, namely either that of mixing hot and cold air together in order to adjust its temperature, or that of distributing the treated or recirculated air. In consequence, it is necessary to provide numerous ducts for carrying air and a plurality of chambers for treating the air. The heating and air distribution unit having this type of structure suffers from major leakage, and in addition, its volumetric size has to be such that it is often not possible to provide space for it in vehicles of current types.

DISCUSSION OF THE INVENTION

An object of the invention is therefore to provide a heating, ventilating and/or air conditioning apparatus which does not have the above mentioned drawbacks of the apparatus in the prior art, especially in terms of useful output and size.

According to the invention, an apparatus for heating, ventilating and/or air conditioning, especially for a motor vehicle, being of the type comprising a heating and air distribution unit which includes a casing containing a heat exchanger and provided with an inlet supplied with air by a motorised fan unit, together with an outlet leading into a lower region of the cabin of the vehicle (also referred to herein as a feet outlet) and a ventilation outlet which also leads to the cabin, with a first valve and a second valve for controlling access of air to the feet outlet and ventilating outlet respectively, is characterised in that the said casing is divided into three ducts, preferably in parallel with each other, in which: a first said duct has an upstream end open at the level of the inlet of the said casing, and a downstream end, which communicates with the feet outlet of the casing under the control of the first valve which is mounted in the said downstream end of the first duct; a second of said ducts has an upstream end which is open at the level of the inlet of the said casing and a downstream end which communicates with the ventilation outlet of the casing under the control of the second valve, which is mounted in the said downstream end of the second duct; and the third said duct contains the heat exchanger in a central zone of the duct and has, upstream of the said heat exchanger, an upstream end which communicates with the inlet of the said casing under the control of a third valve, the third duct having, downstream of the said heat exchanger, two downstream ends (also referred to as a foot outlet and ventilation outlet of the third duct respectively), these two downstream ends being in communication, respectively, with the feet outlet of the casing under the control of the first valve, and with the ventilation outlet of the casing under the control of the said second valve, the apparatus further including control means for acting selectively on the various said valves so as to put them into selected positions.

In this way, the number of ducts and chambers within the casing of the unit is substantially reduced, thus leading to a significant reduction in the overall volumetric size of the casing and a significant reduction in leakage. In addition, the first and second valves have a double function, namely that of temperature regulation and air distribution.

In this document, the terms upstream and downstream are those traditionally used with reference to the heat exchanger. Thus, the word "upstream" will be understood to signify a position situated before the heat exchanger in the direction of air flow, while "downstream" signifies a position situated after the heat exchanger in the same flow direction.

According to a preferred feature of the invention, the apparatus includes, between the heat exchanger and the two downstream ends constituting the feet outlet and ventilation outlet of the third duct, a fourth valve which is adapted to adjust, in response to commands issued from the said control means, the proportion of the hot air emitted by the heat exchanger to be distributed between the feet outlet and ventilation outlet of the casing.

All of the valves are preferably of the pivoting flap valve type, and at least the first, second and fourth valves are adapted to assume a multiplicity of different positions.

According to a particularly preferred feature of the invention, the third duct is disposed between the first and second ducts, i.e. it is sandwiched between them; and the air streams that circulate in the central portions of the three ducts are substantially parallel to each other, which enables the dimensions of the ducts to be reduced, and in consequence also enables losses due to leakage to be reduced even more.

The upstream end of the third duct preferably has a generally frusto-conical form, which facilitates the distribution of the air over the whole of the leading or upstream face of the heat exchanger.

According to yet another preferred feature of the invention, the planes containing the downstream ends constituting the feet outlet and ventilation outlet of the said third duct are disposed substantially at right angles to the plane containing the upstream end of the third duct. This arrangement enables the overall size of the casing to be reduced even further.

In preferred embodiments, the first valve is adapted to assume at least one of the following four positions:

- a closed position in which it prevents cold air flowing toward the feet outlet of the casing, and allows hot air from the heat exchanger to flow towards the feet outlet of the casing;
- an open position in which it prevents hot air flowing to the feet outlet of the casing and allows cold air to flow to the feet outlet of the casing;
- an intermediate central position, in which it partially obstructs the downstream end of the first duct and the feet outlet of the third duct, so as to enable a mixture of hot air and cold air to flow to the feet outlet of the casing; and
- a quarter intermediate position, in which it obstructs substantially one quarter of the downstream end of the first duct and three-quarters of the feet outlet of the third duct, so as to allow a mixture of hot and cold air to be evacuated towards the feet outlet of the casing, the second valve being adapted to assume at least one of the four following positions:

- a closed position in which it prevents flow of cold air towards the ventilation outlet of the casing while allowing hot air from the heat exchanger to flow towards the said ventilation outlet of the casing;
- an open position in which it prevents flow of hot air towards the ventilation outlet of the casing, while allowing cold air to flow towards the ventilation outlet of the casing;
- a central intermediate position in which it partially obstructs the downstream end of the second duct and the ventilation outlet of the third duct, whereby to allow a mixture of hot and cold air to flow towards the ventilation outlet of the casing; and
- a three-quarter intermediate position, in which it obstructs substantially three-quarters of the downstream end of the second duct and one quarter of the ventilation outlet of the third duct, whereby to allow a mixture of hot and cold air to flow towards the ventilation outlet of the casing.

In preferred embodiments where a fourth valve is provided, the fourth valve is adapted to assume at least one of the three following positions:

- a right position, in which it forces all of the hot air from the heat exchanger to pass, via the feet outlet of the third duct, to the feet outlet of the casing;
- a left position, in which it forces all of the hot air from the heat exchanger to pass, via the ventilating outlet of the third duct, to the ventilation outlet of the casing; and
- an intermediate central position, in which it permits hot air from the heat exchanger to pass towards both of said outlets of the casing in substantially equal amounts.

Preferably, the control means are arranged to put the valves in at least one of the following positions:

- a first position, in which the first valve is closed, the second valve open, and the third valve closed, whereby to permit flow of cold air to the ventilation outlet of the casing;
- a second position, in which the first valve is closed, the second valve is in its central intermediate position, the third valve is open, and the fourth valve is in its left position, whereby to permit a mitigated mixture of hot and cold air to flow to the ventilation outlet of the casing;
- a third position, in which the first and second valves are closed, the third valve is open, and the fourth valve is in its left position, whereby to permit hot air to flow from the third duct to the ventilation outlet of the casing;
- a fourth position, in which the first valve is open, the second and third valves being closed, whereby to permit cold air to flow to the feet outlet of the casing;
- a fifth position, in which the first valve is in its central intermediate position, the second valve is closed, the third valve is open, and the fourth valve is in its right position, whereby to permit a mixture of hot and cold air to flow towards the feet outlet of the casing;
- a sixth position, in which the first and second valves are closed, the third valve is open, and the fourth valve is in its right position, whereby to permit hot air to flow from the third duct to the feet outlet of the casing; and
- a seventh position, in which the first valve is in its quarter intermediate position, the second valve is in its three-quarter intermediate position, the third valve is open, and the fourth valve is in its central intermediate position, whereby to enable, firstly, a mixture of hot and cold air at a hot mitigated temperature to flow to the feet outlet of the casing, and secondly, a mixture of hot and cold air at a cold mitigated temperature to flow to the ventilation outlet of the casing.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
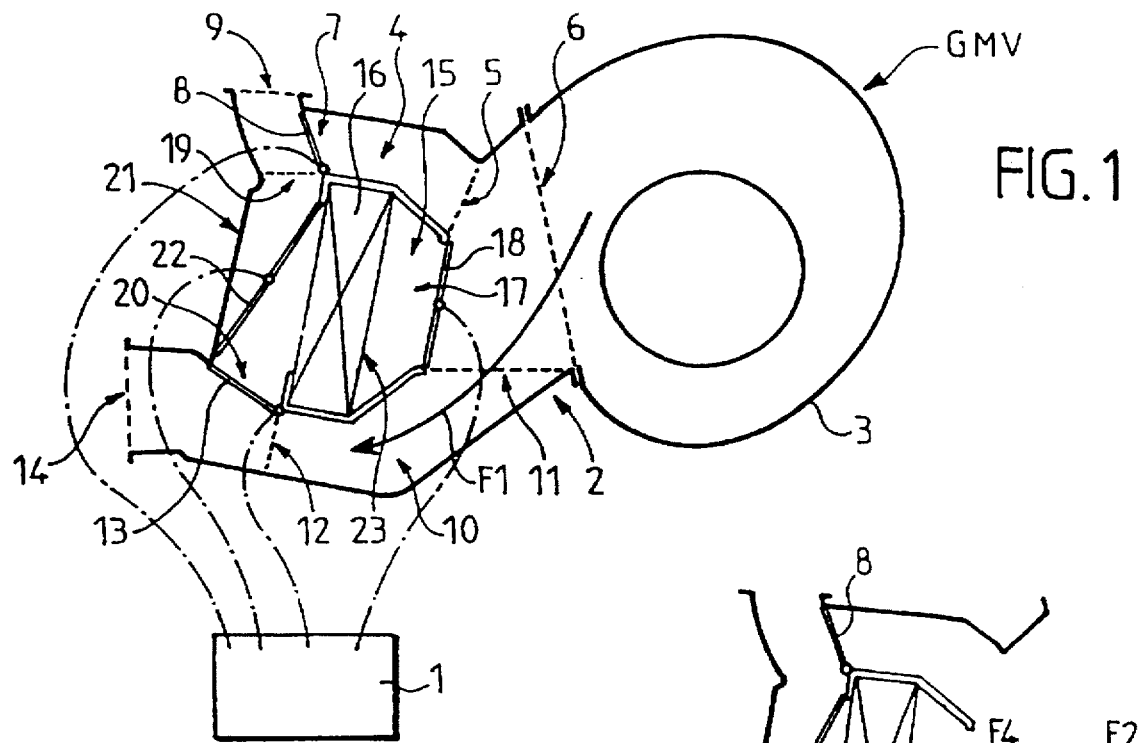
FIG. 1 is a diagrammatic elevation in transverse cross section, showing part of a heating and ventilating apparatus according to the invention, in a first operating mode.

Reference is first made to FIG. 1, in order to describe the relevant features of the heating and ventilating apparatus in accordance with the invention in a preferred embodiment. This embodiment comprises, firstly, an electrical control unit 1 which is mounted below the fascia panel (not shown) of the vehicle, secondly a heating and air distribution unit 2, and thirdly a motorised fan or blower unit GMV. The control unit (or control means) 1 includes means (not shown) for setting and recording environmental parameters for the atmosphere in the cabin of the vehicle, and comprising a data unit which is mounted on the front of the fascia panel. The motorised fan unit GMV includes a blower 3 for delivering air which is received in the form of either fresh air from outside the vehicle, or recirculated air from the cabin, or both, in selected proportions, the blower being arranged to deliver this air to the heating and air distribution unit 2.

Because conventional designs of current heating or air distribution units are not always appropriate to modern vehicles, a new design is embodied in the apparatus shown in the drawings, in which the casing of the heating and air distribution unit 2 is divided into three parts, each of which constitutes a duct. These ducts, which provide for flow of air through them in parallel with each other, are preferably superimposed on each other, in such a way that the air streams which are configured by the respective ducts are also geometrically parallel with each other, at least in their middle part. In FIG. 1, these ducts consist of a first duct 4, a second duct 10, and a third duct 15.

The first duct 4 is disposed in the upper part of the casing of the unit 2 (and in this connection, the casing will be referred to in this description, where appropriate, as the casing 2, for convenience). The duct 4 has an upstream end 5 which is open at the level of the upstream open end (constituting an air inlet) 6 of the casing 2, which is connected to the delivery side of the fan unit GMV, and a downstream end 7 which communicates with an air outlet 9 formed in the upper part of the wall of the casing 2. A first valve 8, which is preferably of the pivoting flap valve type, is mounted in the downstream end 7 of the first duct 4, for controlling the communication between the duct 4 and the outlet 9. This outlet is arranged to supply with air, which may be treated or untreated, the usual ventilation vents (not shown) which are located at the level of the feet of the front and rear occupants of the vehicle. The air passage (not shown) leading from the outlet 9 towards the cabin may optionally be divided into two parts towards its outlet end, with one of these parts feeding air to the vents at foot level, and the other one feeding air to de-icing vents. The purpose of the duct 4 is to convey at least part of the untreated air received from the blower 3, upstream of the outlet 9, which will be referred to from here on in this description as the "feet outlet", while the air carried by the duct 4 will be referred to as cold air.

The second duct 10 is arranged in the lower part of the casing 2. It has an upstream end 7 which is open in the air inlet 6 of the casing 2, and a downstream end 12 which is in communication with a ventilation outlet 14 formed in the lower rear portion of the wall of the casing 2. A second valve 13, which is again preferably of the pivoting flap valve type, is mounted in the downstream end 12 of the second duct 10 for controlling the passage of air from the latter to the ventilation outlet 14. The purpose of the duct 10 is to convey at least part of the cold air upstream of the ventilation outlet 14. The outlet 14 is arranged to supply with air, again either treated or untreated, to air vents (not shown) which are conventionally located, in particular, at the level of the fascia panel of the vehicle.

The third duct 15 is arranged in the middle part of the casing 2, being sandwiched between the first duct 4 and the second duct 10. It contains a heat exchanger 16 in a central zone of the duct, and has, upstream of this heat exchanger, an upstream end 17 which communicates with the air inlet 6 of the casing 2. This communication is controlled by a third valve 18 in the upstream end 17. Downstream of the heat exchanger 16, the duct 15 has two downstream ends. These will be referred to as the "feet" outlet 19 and the "ventilation" outlet 20 of the third duct. These two outlets communicate with the feet outlet 9 and the ventilation outlet 14 of the casing 2 respectively, this communication being controlled by the first valve 8 and the second valve 13 respectively.

Preferably, the upstream end 7 of the first duct 4 and the downstream or "feet" outlet 19 of the third duct 15 are disposed in planes substantially at right angles to each other, so that the first valve 7 is easily able to adjust their respective aperture areas by simple rotation. Similarly, the downstream end 12 of the second duct 10 and the downstream or ventilation outlet 20 of the third duct 15 are disposed in planes substantially at right angles to each other, so that the second valve 13 can in the same way easily adjust the respective aperture areas by simple rotation.

The two outlets 19 and 20 of the duct 15 are accordingly formed in the upper and lower lateral portions of the duct, and they are oriented substantially at right angles to the plane containing the upstream end 17 of the third duct 15. The rear wall 21 of the casing 2 is thus in parallel facing relationship with the upstream end 17 of the third duct 15.

Treated air in the duct 15 is therefore obliged to flow towards one of the downstream ends 19 or 20. For this purpose, a fourth valve 22 is provided downstream of the heat exchanger 16 and upstream of the two outlets 19 and 20 of the duct 15. The valve 22 is preferably of the butterfly type, i.e. a flap valve pivoted in the middle as shown. The valve 22 regulates the proportion of hot air, heated in the heat exchanger 16, to be divided between the feet outlet 9 and the ventilation outlet 14 of the casing 2. The central axis of rotation of the butterfly valve 22 is substantially centred in the duct 15, and this valve has dimensions which are substantially equal to those of the duct 15 at the outlet side of the heat exchanger 16.

In addition, that part of the third duct 15 which lies upstream of the heat exchanger 16 preferably has a frustoconical form, which facilitates better distribution of the cold air over the whole of the upstream face 23 of the heat exchanger 16.

All of the valves are connected to the control unit 1, in order to provide combinations of valve positions, a matter which will be discussed more fully later in this document. At this point, the main positions adopted by the various valves will now be described.

Figure 2:
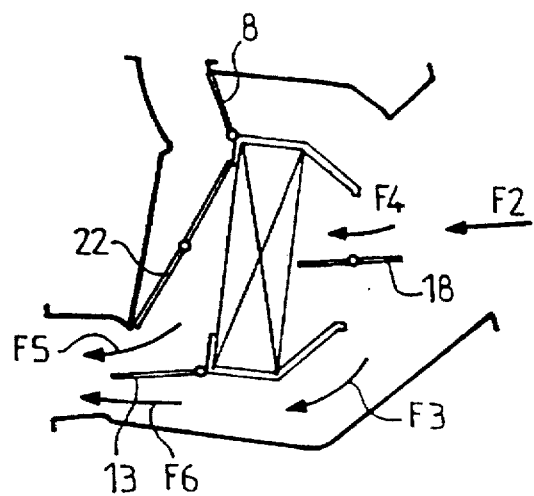
FIG. 2 shows part of the apparatus of FIG. 1, in a second operating mode.
Figure 3:
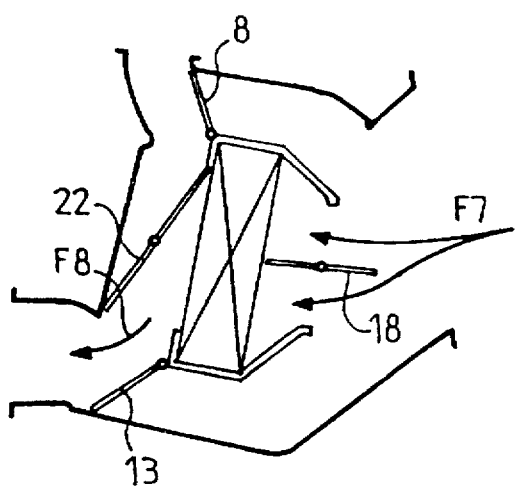
FIG. 3 shows part of the apparatus of FIG. 1, in a third operating mode.
Figure 4:
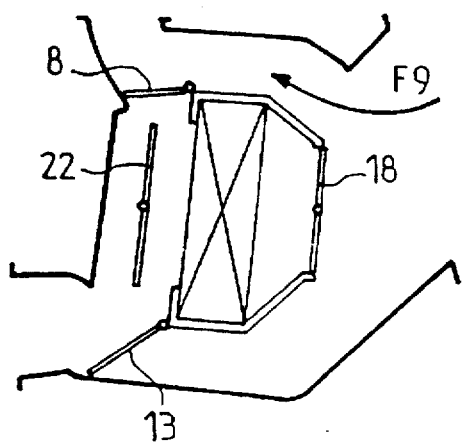
FIG. 4 shows part of the apparatus of FIG. 1, in a fourth operating mode.
Figure 5:
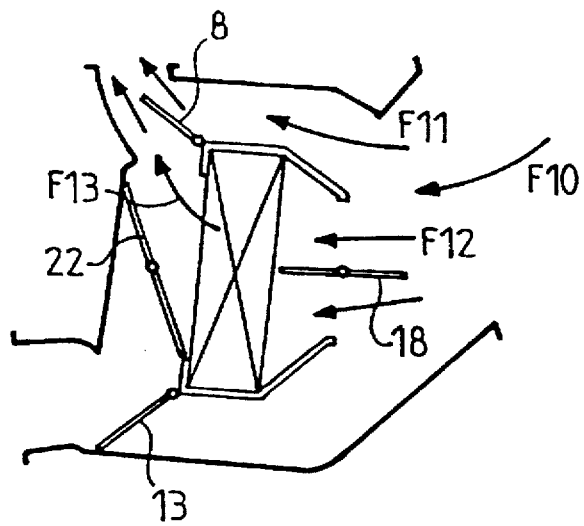
FIG. 5 shows part of the apparatus of FIG. 1, in a fifth operating mode.
Figure 6:
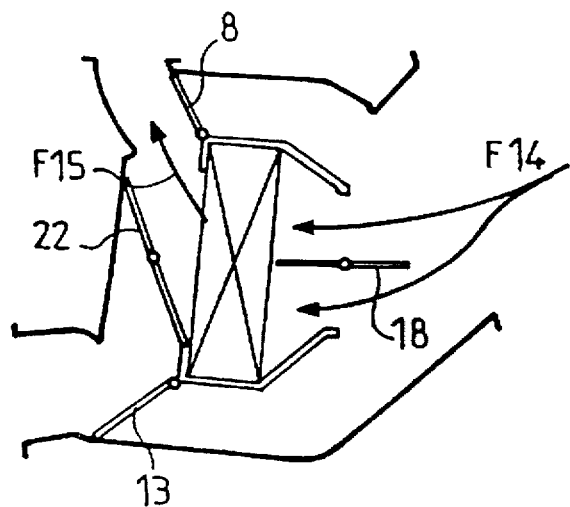
FIG. 6 shows part of the apparatus of FIG. 1, in a sixth operating mode.
Figure 7:
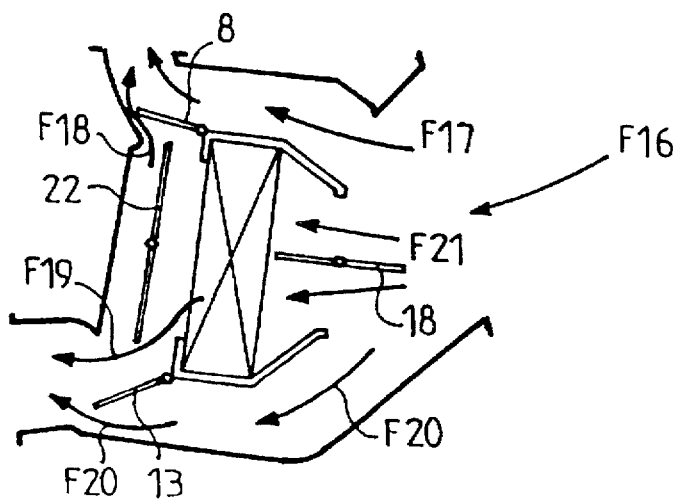
FIG. 7 illustrates part of the apparatus of FIG. 1, in a seventh operating mode.

The first valve 8 can adopt an infinite number of positions, the most important of which are: the closed position shown in FIGS. 1 to 3 and FIG. 6; the open position shown in FIG. 4; the intermediate central position shown in FIG. 5; and the quarter intermediate position shown in FIG. 7.

In the closed position (FIG. 1) the valve 8 prevents cold air from flowing to the feet outlet 9, but allows hot air from the heat exchanger 16 to flow into the outlet 9. In the open position (FIG. 4), the valve 8 prevents hot air from flowing to the outlet 9, but allows cold air to flow to that outlet. In the intermediate central position (FIG. 5), the valve 8 obstructs substantially one half of the opening in the downstream end 7 of the first duct 4, and one half of the feet outlet 19 of the third duct 15. With the valve in this position, a 50/50 mixture of hot air and cold air (referred to as mitigated air) is passed out through the feet outlet 9 of the casing. In the quarter intermediate position (FIG. 7), the valve 8 obstructs substantially a quarter of the opening in the downstream end 7 of the first duct 4, and three-quarters of the feet outlet 19 of the third duct 15. Therefore, with the valve 8 in this position, the feet outlet 9 of the casing receives a mixture of approximately 25% hot air and 75% cold air (referred to as cold mitigated air).

The second valve 13 can again adopt an infinite number of positions, the four most important of which are: a closed position shown in FIGS. 3 and 4; an open position shown in FIG. 1; a central intermediate position shown in FIG. 2; and a three-quarter intermediate position shown in FIG. 7.

In the closed position (FIGS. 3 and 4), the valve 13 prevents cold air from flowing towards the ventilation outlet 14 of the casing, while allowing hot air from the heat exchanger 16 to flow to the outlet 14. In the open position (FIG. 1), the valve 13 prevents hot air from flowing towards the ventilation outlet 14, while allowing cold air to flow to that outlet. In the central intermediate position (FIG. 2), the valve 13 obstructs substantially one half of the opening in the downstream end 12 of the second duct 10, and one half of the ventilation outlet 20 of the third duct 15. Accordingly, in this position the ventilation outlet 14 of the casing receives a 50/50 (mitigated) mixture of hot and cold air. In the three-quarter intermediate position (FIG. 7), the valve 13 obstructs three-quarters of the opening in the downstream end 12 of the second duct 10, and one quarter of the ventilation outlet 20 of the third duct 15. Here, the ventilation outlet 14 of the casing receives a mixture of about 75% hot air and 25% cold air (referred to as hot mitigated air).

It will be understood that, according to the various options available, a large number of intermediate positions can be envisaged for the first and second valves, other than those referred to above as the central, quarter and three-quarter intermediate positions. Such positions enable unequal proportions of hot and cold air to be obtained, which vary between 1% and 99% for the openings in the downstream ends of the appropriate ducts controlled by the valves.

The fourth valve 22 is arranged to adopt an infinite number of positions, the three most important of which are: a position referred to as the "right" position, which is that shown in FIG. 5; a position referred to as the "left" position, shown in FIG. 1; and a central intermediate position shown in FIG. 7. In the left position (FIG. 1), the valve 22 forces all of the hot air issuing from the heat exchanger 16 to be evacuated towards the ventilation outlet 14 of the casing. In the right position (FIG. 5), the valve 22 forces all of the hot air issued from the heat exchanger 16 to be evacuated towards the feet outlet 9 of the casing. In the central intermediate position (FIG. 7), the valve 22 provides substantially equal distribution of the hot air from the heat exchanger 16 towards the feet outlet 19 and the ventilation outlet 20 of the third duct 15.

Again, as with the first and second valves described above, there are many options for the assumption by the fourth valve 22 of intermediate positions other than the central intermediate position, so enabling unequal proportions of hot and cold air, varying between 1% and 99% as between the aperture areas of the feet outlet 19 and ventilation outlet 20, to be obtained.

The third valve 18 has a closed position shown in FIG. 1 and an open position shown in FIG. 2, in which it prevents any access, or allows full access, respectively, for cold air to reach the heat exchanger 16. Again, the third valve 18 is of course capable of adopting any number of intermediate positions between its open and closed positions.

In the example illustrated in FIG. 1, the apparatus is in an operating mode referred to as a cold ventilation mode. In this mode, the first valve 8 is in its closed position, while the second valve 13 is in its open position and the third valve 18 is closed. The fourth valve 22 may be in any position, because, since the third valve 18 is closed, the valve 22 has no influence at all on either the treatment of the air or its distribution. In this cold ventilation operating mode, the air delivered by the blower 3, in accordance with the arrow F1 in FIG. 1, can only pass through the second duct 10, so that all of this air is channeled to the ventilation outlet 14 of the casing, since the second valve 13 is in its open position.

Reference will now be made to FIGS. 2 to 7 to describe other operating modes of the apparatus.

The apparatus can operate in a mode referred to as the mitigated ventilation mode, which is shown in FIG. 2. For this purpose, the first valve 8 is put in its closed position, the second valve 13 in its central intermediate position, the third valve 18 in its open position, and the fourth valve 22 in its left position as in FIG. 1. The air delivered from the blower 3, in the direction of the arrow F2, can then only pass through the second duct 10 (arrow F3) and the third duct 18 (arrow F4). The proportion of the air that enters the third duct 15 is heated while passing through the heat exchanger 16, and is then directed by the fourth valve 22 to the ventilation outlet 20, which is partially open because the second valve 13 is in its central intermediate position. This hot air is then mixed with the cold air from the second duct 10 (arrow F6). The resulting air mixture then leaves the casing 2 through the ventilation outlet 14.

FIG. 3 illustrates an operating mode which is referred to as the hot ventilation mode. Here, the first valve 8 and the second valve 13 are both in their closed positions, the third valve 18 being open and the fourth valve 22, again, in its left position. The air from the blower 3 can here only pass through the third duct 15 (arrow F7), so that it is all heated while passing through the heat exchanger 16. All of this hot air is forced by the fourth valve 22 to pass, as indicated by the arrow F8, via the ventilation outlet 20 (which is fully open since the second valve 13 is in its closed position), to leave the casing 2 via the ventilation outlet 14.

FIG. 4 shows an operating mode which is referred to as the "cold feet" mode. In this mode, the first valve 8 is in its open position, and the second valve 13 and third valve 18 are in their closed positions. The fourth valve 22 plays no part in this operating mode, and may therefore be in any position, such as the central intermediate position shown in FIG. 4. The air from the blower 3 can only pass through the first duct 4 (arrow F9), in which it is channeled to the feet outlet 9 of the casing 2, since the first valve 8 is in its open position.

FIG. 5 shows a further operating mode which is called the mitigated feet mode. Here the first valve 8 is in its central intermediate position, the second valve 13 is in its closed position, the third valve 18 is open, and the fourth valve 22 is in its right position. The air from the blower 3 (arrow F10) can here only pass through the first duct 4 (as indicated by the arrow F11) and the third duct 15 as indicated by the arrow F12. That proportion of the air that passes through the third duct 15 is heated in the heat exchanger 16, and is directed by the fourth valve 22, as indicated by the arrow F13, towards the feet outlet 19, which is partly open due to the central intermediate position of the first valve 8. This hot air is then mixed with the cold air F11 from the first duct, so that the resulting equal mixture of hot and cold air leaves the casing via the feet outlet 9.

The operating mode shown in FIG. 6 is referred to as the "hot feet" mode, in which the first valve 8 and the second valve 13 are closed, the third valve 18 is open, and the fourth valve 22 is in its right position. Here, the air from the blower 3 can only pass through the duct 15, as indicated by the arrows F14, and all of this air is therefore heated in the heat exchanger 16, before being guided by the valve 22 (arrow F15) to the feet outlet 9 of the casing via the feet outlet 19 of the duct 15, the outlet 19 being fully open because of the closed position of the valve 8.

The final operating mode illustrated in the drawings is a mode referred to as the "bi-level" or stratified temperature mode, shown in FIG. 7. In this mode, the first valve 8 and the second valve 13 are put into respective intermediate positions which are different from each other, while the third valve 18 is open and the fourth valve 22 is in its central position. For example, the first valve 8 may be in its quarter intermediate position, and the second valve 13 in its three-quarter intermediate position. This is the configuration shown in FIG. 7.

In this bi-level mode, the air from the blower 3 passes through all three of the ducts 4, 10 and 15 in parallel. A first portion of cold air F17 is directed through the duct 4 to the feet outlet 9, and a second portion of cold air F20 is directed through the lower duct 10 to the ventilation outlet 14 of the casing. The remainder of the cold air passes, as indicated by the arrows F21, into the third duct 15, where it is heated by the heat exchanger 16. Since the valve 8 is partly open, the valve 22 being in an intermediate position, some of this heated air, indicated by the arrow F18, passes via the feet outlet 19 to the feet outlet 9 of the casing, while the remainder of the heated air passes, as indicated by the arrow F19, to the ventilation outlet 14 of the casing. The proportions of the heated air represented by the arrows F18 and F19 may be, but are not necessarily, equal. Beyond the feet outlet 19, the heated air mixes with the cold air stream F17 to form a hot mitigated air mixture, while the remainder of the heated air is mixed downstream of the ventilation outlet 14 to form a tepid air (or cold mitigated air) mixture exhausting through the outlet 14 of the casing.

In this stratified temperature mode, a temperature gradient is therefore obtained between the feet outlet 9 and the ventilation outlet 14, with the hottest end of the gradient being at the outlet 9. It will be clear that, in accordance with the intermediate settings chosen for the first valve 8 and the second valve 13, this temperature gradient may be modified at will.

A large number of other operating modes can of course be envisaged, but these are in general variations on those which have been described above, and therefore differ from them only in terms of combinations of the respective positions of the four valves. Thus, operating modes can be envisaged in which air delivered to the feet and ventilating outlets 9, 14 of the casing is at the same temperature, whether cold, hot, or "mitigated". In this connection, where this air is hot, the first and second valves are put in their closed position and the third valve in its open position, while the fourth valve is put in its central position.

Where the air passed into the cabin is cold, the first and second valves are put in their open position and the third valve in its closed position, while the fourth valve can be in any position, for example its central intermediate position, because it plays no part in the process.

Where all of the air passed into the cabin is "mitigated" (i.e. 50:50 hot air and cold air), the first and second valves are in their central intermediate positions, while the third valve is open and the fourth valve in its central intermediate position.

While the above description is related to a heating and ventilating installation, it will be clearly understood that the invention is just as well applicable to an installation for heating, ventilating and air conditioning. Similarly, the invention is applicable to arrangements in which the ducts are arranged differently from those described and shown, to the extent that such arrangements remain within the scope of the Claims of this application.

What is claimed is:

1. Apparatus for a motor vehicle having a cabin, for heating and ventilating the cabin, and including: a motorised fan unit having a delivery side; a heating and air distribution unit having an open inlet connected to the delivery side of the motorised fan unit; and a heat exchanger contained in the heating and air distribution unit, said unit comprising a casing defining a feet outlet for delivering air towards a lower region of the cabin, and a ventilation outlet for delivering air into the cabin, said unit further including a first valve upstream of the feet outlet of the casing for controlling access of air to said feet outlet, and a second valve upstream of the ventilation outlet of the casing for controlling access of air to said ventilation outlet, wherein said casing defines within it three ducts, namely a first duct, a second duct, and a third duct having a central region, the heat exchanger being mounted in said central region of the third duct, the first duct defining an upstream end thereof open at said inlet of the casing, and a downstream end communicating with said feet outlet of the casing, said first valve being mounted in the downstream end of the first duct, the second duct having an upstream end open at the inlet of the casing and a downstream end communicating with the ventilation outlet of the casing, said second valve being mounted in the downstream end of the second duct, the third duct having an upstream end upstream of the heat exchanger and a third valve in said upstream end, said upstream end of the third duct being arranged for selective communication with the inlet of the casing under the control of the said third valve, the third duct further defining, downstream of the heat exchanger, a feet outlet of the third duct and a ventilation outlet of the third duct, adjacent to the feet outlet and ventilation outlet respectively of the casing, whereby to communicate selectively, under the control of the said first and second valves respectively, with the feet outlet and ventilation outlet respectively of the casing, the apparatus further including control means connected with the said valves for putting the valves into selected positions, further including a fourth valve connected with said control means and disposed between the heat exchanger and said downstream ends of the third duct, whereby to adjust, in response to command signals form the control means, the proportion of hot air emitted by the heat exchanger to be distributed between said outlets of the third duct.

2. Apparatus according to claim 1, wherein the first and second ducts are disposed on either side of the third duct.

3. Apparatus according to claim 2, wherein the upstream end of the third duct is generally frusto-conical.

4. Apparatus according to claim 2, wherein said third duct defines two substantially parallel planes containing said outlets of the third duct respectively, the upstream end of the third duct defining a third plane substantially at right angles to said parallel planes.

5. Apparatus according to claim 2, wherein each said duct has a central region, said central regions being substantially parallel to each other.

6. Apparatus according to claim 1, wherein each said valve is a pivoting flap valve.

7. Apparatus according to claim 1, wherein the first, second and fourth valves are adapted to assume a multiplicity of positions.

8. Apparatus according to claim 7, wherein the first valve is adapted to assume at least one of the following four positions:

a closed position in which it prevents cold air flowing toward the feet outlet of the casing, and allows hot air from the heat exchanger to flow towards the feet outlet of the casing;

an open position in which it prevents hot air flowing to the feet outlet of the casing and allows cold air to flow to the feet outlet of the casing;

an intermediate central position, in which it partially obstructs the downstream end of the first duct and the feet outlet of the third duct, so as to enable a mixture of hot air and cold air to flow to the feet outlet of the casing; and a quarter intermediate position, in which it obstructs substantially one quarter of the downstream end of the first duct and three-quarters of the feet outlet of the third duct, so as to allow a mixture of hot and cold air to be evacuated towards the feet outlet of the casing, the second valve being adapted to assume at least one of the four following positions:

a closed position in which it prevents flow of cold air towards the ventilation outlet of the casing while allowing hot air from the heat exchanger to flow towards said ventilation outlet of the casing;

an open position in which it prevents flow of hot air towards the ventilation outlet of the casing, while allowing cold air to flow towards the ventilation outlet of the casing;

a central intermediate position in which it partially obstructs the downstream end of the second duct and the ventilation outlet of the third duct, whereby to allow a mixture of hot and cold air to flow towards the ventilation outlet of the casing; and a three-quarter intermediate position, in which it obstructs substantially three-quarters of the downstream end of the second duct and one quarter of the ventilation outlet of the third duct, whereby to allow a mixture of hot and cold air to flow towards the ventilation outlet of the casing.

9. Apparatus according to claim 7, wherein the fourth valve is adapted to assume at least one of the three following positions:

a right position, in which it forces all of the hot air from the heat exchanger to pass, via the feet outlet of the third duct, to the feet outlet of the casing;

a left position, in which it forces all of the hot air from the heat exchanger to pass, via the ventilating outlet of the third duct, to the ventilation outlet of the casing; and an intermediate central position, in which it permits hot air from the heat exchanger to pass towards both of said outlets of the casing in substantially equal amounts.

10. Apparatus according to claim 1, wherein the third valve is adapted to assume at least one of a closed position and an open position, in which, respectively, the third valve prevents or permits access of air to the heat exchanger.

11. Apparatus according to claim 1, wherein the third valve is adapted to assume at least one of a closed position and an open position, in which, respectively, the third valve prevents or permits access of air to the heat exchanger, and wherein the control means are arranged to set the valves for operating the apparatus in at least one of the following modes:

a first mode, in which the first valve is closed, the second valve open, and the third valve closed, whereby to permit flow of only cold air to the ventilation outlet of the casing, flow of air to the feet outlet of the casing being absent;

a second mode, in which the first valve is closed, the second valve is in a central intermediate position, the third valve is open, and the fourth valve is in a position putting the third duct into communication with said ventilating outlets, whereby to permit a mitigated mixture of hot and cold air to flow to the ventilation outlet of the casing, flow of air to the feet outlet of the casing being absent;

a third mode, in which the first and second valves are closed, the third valve is open, and the fourth valve is in a position putting the third duct into communication with said ventilating outlets, whereby to permit only hot air to flow from the third duct to the ventilation outlet of the casing, flow of air to the feet outlet of the casing being absent;

a fourth mode, in which the first valve is open, the second and third valves being closed, whereby to permit only cold air to flow to the feet outlet of the casing, flow of air to the ventilation outlet of the casing being absent;

a fifth mode, in which the first valve is in a central intermediate position, the second valve is closed, the third valve is open, and the fourth valve is in a position putting the third duct into communication with the feet outlets, whereby to permit a mixture of hot and cold air to flow towards the feet outlet of the casing, flow of air to the ventilation outlet of the casing being absent;

a sixth mode, in which the first and second valves are closed, the third valve is open, and the fourth valve is in a position putting the third duct into communication with the feet outlets, whereby to permit only hot air to flow from the third duct to the feet outlet of the casing, flow of air to the ventilation outlet of the casing being absent; and a seventh mode, in which the first valve is in a quarter intermediate position, the second valve is in a three-quarter intermediate position, the third valve is open, and the fourth valve is in a central intermediate position, whereby to enable, firstly, a mixture of hot and cold air at a hot mitigated temperature to flow to the feet outlet of the casing, and secondly, a mixture of hot and cold air at a hot mitigated temperature to flow to the ventilation outlet of the casing.

* * * * *